US008184081B2

(12) United States Patent
Tsai

(10) Patent No.: US 8,184,081 B2
(45) Date of Patent: May 22, 2012

(54) PIXEL UNIT, METHOD FOR CONTROLLING THE PIXEL UNIT, AND DISPLAY APPARATUS COMPRISING THE SAME

(75) Inventor: Meng-Chang Tsai, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 816 days.

(21) Appl. No.: 12/052,213

(22) Filed: Mar. 20, 2008

(65) Prior Publication Data

US 2009/0091557 A1 Apr. 9, 2009

(30) Foreign Application Priority Data

Oct. 4, 2007 (TW) ............................... 96137214 A

(51) Int. Cl.
*G09G 3/36* (2006.01)
*G09G 5/00* (2006.01)
*G06F 3/038* (2006.01)

(52) U.S. Cl. ............... 345/94; 345/87; 345/90; 345/204

(58) Field of Classification Search .............. 345/87–94, 345/204, 690

See application file for complete search history.

(56) References Cited

U.S. PATENT DOCUMENTS 5,940,055 A 8/1999 Lee
6,778,163 B2 * 8/2004 Ozawa ............................ 345/96
6,864,872 B2 * 3/2005 Yang ............................... 345/94
2007/0285365 A1 * 12/2007 Lee ................................. 345/87
2008/0079884 A1 * 4/2008 Chiu et al. ..................... 349/143
2008/0291222 A1 * 11/2008 Hou et al. ........................ 345/92

FOREIGN PATENT DOCUMENTS

JP 2003-066920 3/2003

OTHER PUBLICATIONS

Taiwanese language office action dated May 27, 2010.
English language translation of Taiwanese office action.
English language translation of pertinent parts of JP 2003-066920 (published Mar. 5, 2003).

* cited by examiner

*Primary Examiner* — Bipin Shalwala
*Assistant Examiner* — Ryan A Lubit
(74) *Attorney, Agent, or Firm* — Thomas, Kayden, Horstemeyer & Risley, LLP

(57) ABSTRACT

A pixel unit, a method for controlling the pixel unit, and a display apparatus having the same are provided. The display apparatus includes a driving circuit and a plurality of pixel units. Each of the pixel unit includes a switch circuit and an energy storage circuit. The energy storage circuit has a first end, a second end, and a third end. The first end is coupled to the switch circuit. The second end is electrically connected to the driving circuit so that the drive circuit is able to provide a first voltage to the second end. The third end is electrically connected to the driving circuit so that the driving circuit is able to provide a second voltage and a third voltage to the third end before the first voltage transits. There is a difference between the second voltage and the third voltage in order to generate a voltage oscillation with in the pixel unit. Therefore, the problem of color washout can be solved.

9 Claims, 4 Drawing Sheets

PIXEL UNIT, METHOD FOR CONTROLLING THE PIXEL UNIT, AND DISPLAY APPARATUS COMPRISING THE SAME

This application claims the benefit of priority based on Taiwan Patent Application No. 096137214 filed on Oct. 4, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a pixel unit, a method for controlling the pixel unit, and a display apparatus comprising the same. More specifically, the present invention relates to a pixel unit for reducing the color washout by switching the voltage, a method for controlling the pixel unit, and a display apparatus comprising the same.

2. Descriptions of the Related Art

The liquid crystal display (LCD), a full color display device utilizing liquid crystal technology, has many advantages such as low power consumption, low radiations, lightweight, and having flexibility in size. Therefore, LCD screens are now in widespread use in various kinds of products, such as digital cameras, personal digital assistants (PDAs), and television sets.

However, LCD screens provide relatively small viewing angles. This means that a person at the front of an LCD screen will feel the color shown on the LCD screen colorfully; however, a person at the lateral of the LCD screen will feel the color degraded. The phenomenon is also called “color washout”. In other words, LCD screens provide bad viewing qualities for people viewing from laterals of the LCD screens.

To solve the above color washout problem of LCD screens, several techniques have been proposed: capacitance coupling, com-swing, and dual thin film transistor (dual-TFT). However, all the three solutions require two transistors, which increase the cost. Another drawback of the conventional solutions is that the additional transistors decrease the aperture ratio of the LCD screens, which reduces the display qualities of LCD screens.

According to the above descriptions, it is important to effectively reduce the color washout of the LCD screens without increasing the cost and without reducing the display quality.

SUMMARY OF THE INVENTION

An objective of the present invention is to provide a pixel unit for use in a display apparatus. The display apparatus comprises a driving circuit. The pixel unit comprises a switch circuit and an energy accumulation circuit. The energy accumulation circuit has a first end, a second end, and a third end. The first end is coupled to the switch circuit. The second end is electrically connected to the driving circuit so that the driving circuit is able to provide a first voltage to the second end of the energy accumulation circuit. The third end is electrically connected to the driving circuit so that the driving circuit is able to provide a second voltage and a third voltage to the third end of the energy accumulation circuit before the first voltage transits. The second voltage has a difference value from the third voltage.

Another objective of the present invention is to provide a display apparatus that comprises a driving circuit and a plurality of pixel units. The driving circuit is configured for providing a first voltage, a second voltage, and a third voltage. The pixel units are coupled to the driving circuit. Each of the pixel unit comprises a switch circuit and an energy accumulation circuit. The energy accumulation circuit has a first end, a second end, and a third end. The first end is coupled to the switch circuit. The second end is electrically connected to the driving circuit so that the driving circuit is able to provide a first voltage to the second end of the energy accumulation circuit. A third end is electrically connected to the driving circuit so that the driving circuit is able to provide a second voltage and a third voltage to the third end of the energy accumulation circuit before the first voltage transits. The second voltage has a difference value from the third voltage.

Yet a further objective of the present invention is to provide a method for controlling a pixel unit. The pixel unit comprises an energy accumulation circuit. The method comprises the following steps: providing a first voltage to the pixel unit; and providing a second voltage and a third voltage to the pixel unit to enable the pixel unit to generate a voltage vibration before the first voltage transits. The second voltage has a difference value from the third voltage.

When the pixel unit of the present invention operates, two ends of the pixel unit are configured to receive voltages. The voltage level received by one of the two ends is fixed while the other end receives two voltages with different voltage levels before transition. This makes the node in the pixel unit generated a voltage oscillation so that the sub-pixel area connected to the pixel unit may illuminate light with different color tone to effectively reduce color washout phenomenon.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
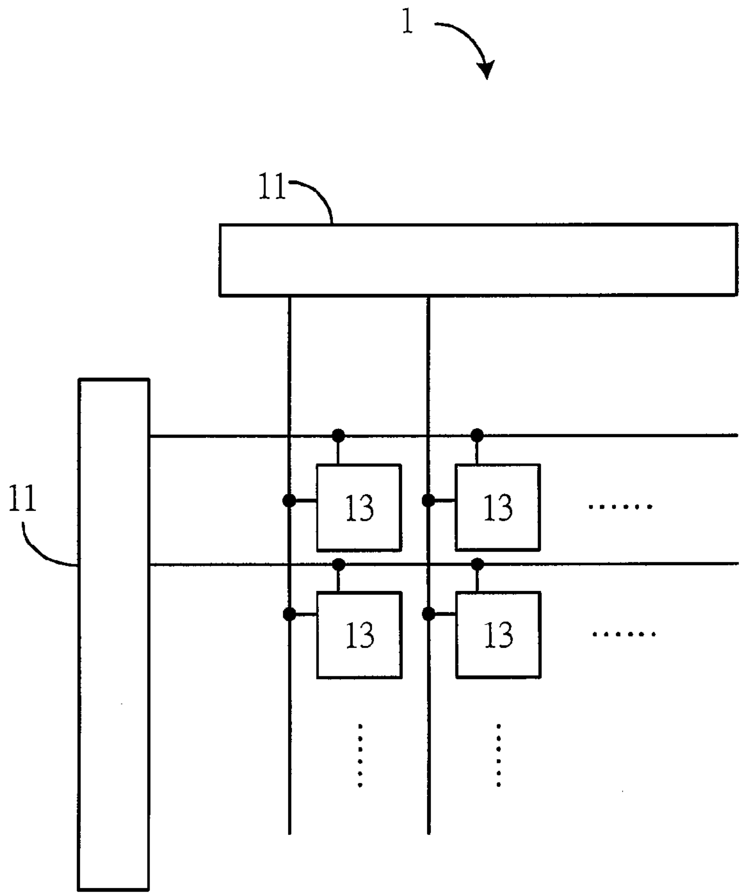
FIG. 1 illustrates the first preferred embodiment of the present invention.

FIG. 1 illustrates a first preferred embodiment of the present invention, which is a display apparatus 1. The display apparatus 1 comprises a driving circuit 11 and a plurality of pixel units 13. The driving circuit 11 is coupled to the pixel units 13 to provide a first voltage, a second voltage, a third voltage to the pixel units 13. Each of the pixel units 13 is coupled to a sub-pixel area. The liquid crystals within the sub-pixel areas twist their angles in response to the voltage of the corresponding pixel units 13. The details are described as follow.

Figure 2:
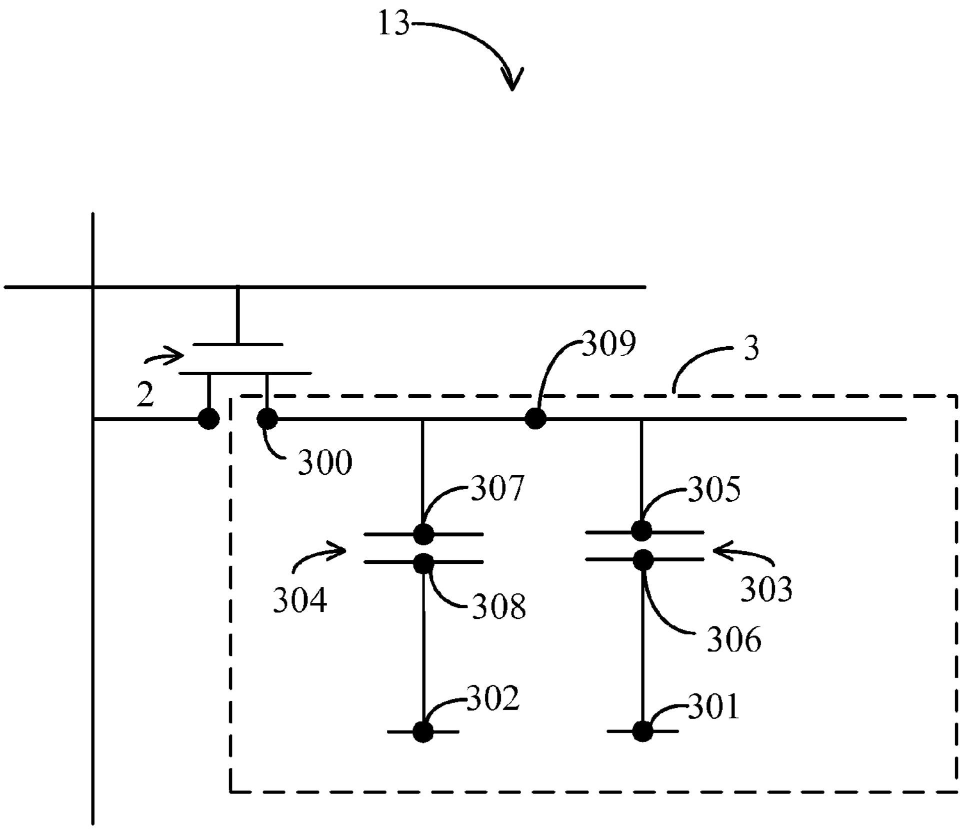
FIG. 2 illustrates the circuit diagram of the pixel unit of the first preferred embodiment.

FIG. 2 illustrates the circuit diagram 13 of the pixel unit of the present invention. The pixel unit 13 comprises a switch circuit 2 and an energy accumulation circuit 3. In this preferred embodiment, the switch circuit 2 is a transistor, such as a P-type transistor or an N-type transistor. The energy accumulation circuit 3 has a first end 300, a second end 301, and a third end 302. The first end 300 is coupled to the switch circuit 2. The second end 301 is electrically connected to the driving circuit 11 so that the driving circuit 11 is able to provide the first voltage to the second end 301 of the energy accumulation circuit 3. The third end 302 is electrically connected to the driving circuit 11 so that the driving circuit 11 is able to provide a second voltage and a third voltage to the third end 302 of the energy accumulation circuit 3 before the first voltage transits. The second voltage has a difference value from the third voltage.

In this preferred embodiment, the energy accumulation circuit 3 comprises a variable capacitor 303 and a fixed capacitor 304. The variable capacitor 303 has a first end 305 and a second end 306, wherein the first end 305 is coupled to the switch circuit 2. The second end 306 is coupled to the driving circuit 11 so that the driving circuit 11 is able to provide the first voltage to the second end 306. The fixed capacitor 304 has a first end 307 and a second end 308, wherein the first end 307 is coupled to the switch circuit 2. The second end 308 is coupled to the driving circuit 11 so that the driving circuit 11 is able to provide the second voltage and the third voltage to the second end 308.

When the driving circuit 11 and the pixel units 13 operate, the voltage level of the node 309 and the voltage level of the second end 301 of the energy accumulation circuit 3 will be respectively provided to two electrode ends of the corresponding sub-pixel area. In other words, the display angle of the liquid crystals within the sub-pixel area is decided according to the voltage deference between the node 309 and the second end 301 of the energy accumulation circuit 3. It is well-know by people skilled in this field, so are not described in details herein.

Figure 3A:
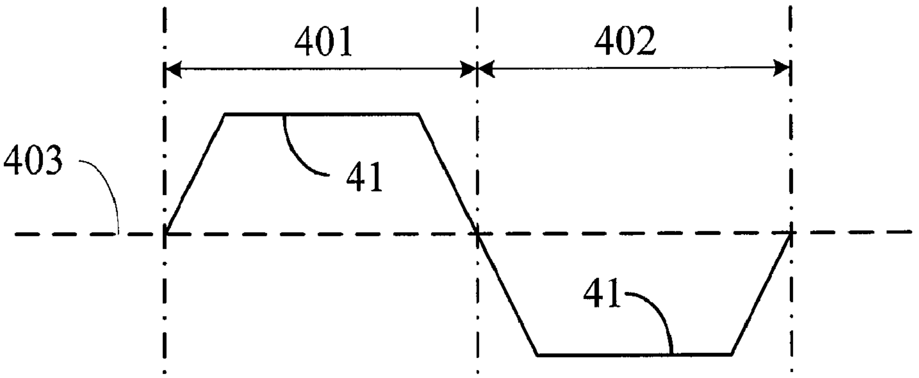
FIG. 3*a* illustrates the waveform diagram of the first voltage of the first preferred embodiment.
Figure 3B:
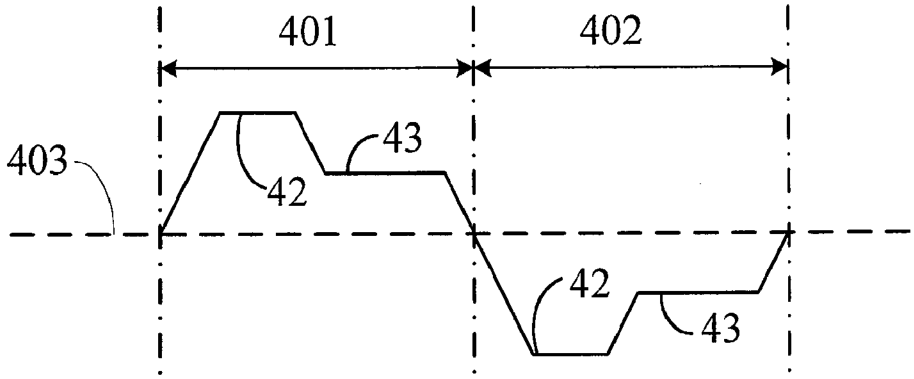
FIG. 3*b* illustrates the waveform diagram of the second and third voltages of the first preferred embodiment.
Figure 3C:
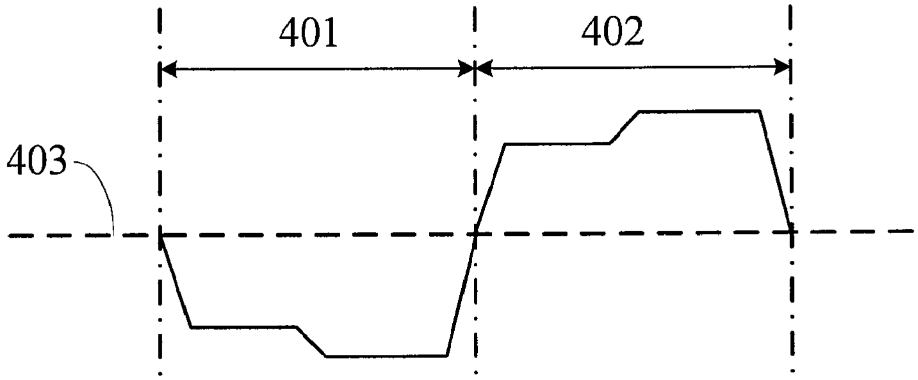
FIG. 3*c* illustrates the waveform diagram of the node inside the pixel unit of the present invention.

FIGS. 3*a*, 3*b*, and 3*c* will be described at the same time. FIG. 3*a* is a waveform diagram of the first voltage 41 that is provided to the second end 301 of the pixel unit 13 by the driving circuit 11. The first half period 401 is the time before the first voltage 41 transits, while the second half period 402 is the time after the first voltage 41 transits. The dotted line 403 is the reference voltage level. FIG. 3*b* is a waveform diagram of the second voltage 42 and the third voltage 43 that are provided to the third end 302 of the pixel unit 13. In FIG. 3*b*, the waveforms corresponding to the first half period 401 (i.e. before the first voltage 41 transits) are the waveforms of the second voltage 42 and the third voltage 43 in sequence. The second half period 402 is similar to the first half period 401 and not repeated herein. Since voltage provided to the third end 302 by the driving circuit 11 oscillates (i.e. providing the second voltage 42 and the third voltage 43 in the first half period), the voltage of the node 309 oscillates as well. FIG. 3*c* is a waveform diagram illustrating the voltage of the node 309.

As described above, the display angle of the liquid crystals with the sub-pixel areas is decided according to the voltage deference between the node 309 and the second end 301 of the energy accumulation circuit 3. Since the voltage of the node 309 oscillates within each half period, the voltage difference between the node 309 and the second end 301 of the energy accumulation circuit 3 oscillates as well. Thus, before and after the first voltage 41 transits, the liquid crystals within the sub-pixel area connected to the pixel unit 13 will be in different angles to reduce the color washout.

Figure 4:
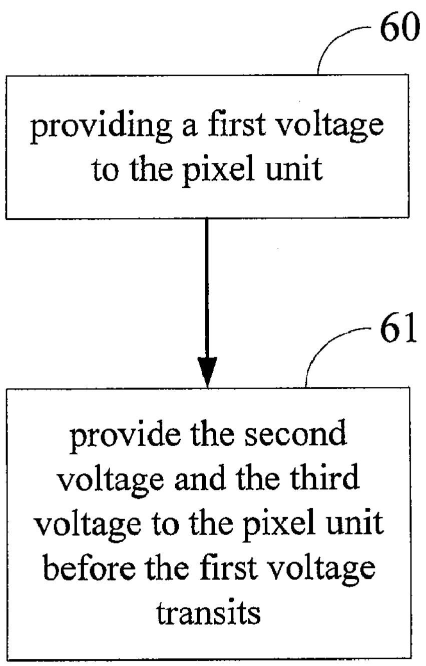
FIG. 4 illustrates the flow chart of the second preferred embodiment of the present invention.

A second preferred embodiment of the present invention is illustrated in FIG. 4, which is a flow chart of a method for controlling the pixel unit. The pixel unit comprises an energy accumulation circuit. At first, the step 60 is executed to provide a first voltage to the pixel unit. Next, the step 61 is executed to provide a second voltage and a third voltage to the pixel unit before the first voltage transits. The second voltage has a different value from the third voltage in order to enable the pixel unit generating a voltage oscillation for reducing the color washout phenomenon.

For a pixel unit in accordance with the present invention, a second voltage and a third voltage are provided to the pixel unit after the pixel unit is provided with a first voltage and before the first voltage transits. Since there is a difference voltage between the second and third voltage, voltage oscillates. Thus, the liquid crystals of the sub-pixel area that is connected to the pixel unit have different display angles before and after the first voltage transits. The present invention can effectively solve the color washout problem of the conventional LCDs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A pixel unit for use in a display apparatus, the display apparatus comprising a driving circuit, the pixel unit comprising:
- a switch circuit; and
- an energy accumulation circuit, having:
  - a first end, coupled to the switch circuit;
  - a second end, electrically connected to the driving circuit wherein the driving circuit provides a first voltage to the second end of the energy accumulation circuit in a first half period and another first voltage to the second end of the energy accumulation circuit in a second half period, the first voltage is opposite to the another first voltage; and
  - a third end, electrically connected to the driving circuit wherein the driving circuit provides a second voltage and a third voltage to the third end of the energy accumulation circuit in the first half period and another second voltage and another third voltage to the third end of the energy accumulation circuit in the second half period to oscillate a voltage difference between the first end and the second end to reduce color washout;
- wherein the second voltage is opposite to the another second voltage, the third voltage is opposite to the another third voltage, the second voltage is different from the third voltage, the another second voltage is different from the another third voltage, the second voltage and the third voltage have a first polarity, and the another second voltage and the another third voltage have a polarity opposite that of the first polarity.

2. The pixel unit of the claim 1, wherein the energy accumulation circuit comprises:
- a variable capacitor, having a first end and a second end, the first end of the variable capacitor being coupled to the switch circuit, the second end of the variable capacitor being coupled to the driving circuit so that the driving circuit is able to provide the first voltage to the second end of the variable capacitor; and a fixed capacitor, having a first end and a second end, the first end of the fixed capacitor being coupled to the switch circuit, the second end of the fixed capacitor being coupled to the driving circuit so that the driving circuit is able to provide the second voltage and the third voltage to the second end of the fixed capacitor.

3. The pixel unit of the claim 1, wherein the switch circuit is a transistor.

4. The pixel unit of the claim 3, wherein the transistor is one of a p-type transistor and an n-type transistor.

5. A display apparatus, comprising:

a driving circuit for providing a first voltage, another first voltage, a second voltage, another second voltage, a third voltage, and another third voltage; and a plurality of pixel units, being coupled to the driving circuit, each of the pixel units comprising:

a switch circuit; and an energy accumulation circuit, having:

a first end, coupled to the switch circuit;

a second end, electrically connected to the driving circuit wherein the driving circuit provides a first voltage to the second end of the energy accumulation circuit in a first half period and the another first voltage to the second end of the energy accumulation circuit in a second half period, the first voltage is opposite to the another first voltage; and a third end, electrically connected to the driving circuit wherein the driving circuit provides a the second voltage and a third voltage to the third end of the energy accumulation circuit in the first half period and the another second voltage and the another third voltage to the third end of the energy accumulation circuit in the second half period to oscillate a voltage difference between the first end and the second end to reduce color washout;

wherein the second voltage is opposite to the another second voltage, the third voltage is opposite to the another third voltage, the second voltage is different from the third voltage, the another second voltage is different from the another third voltage, the second voltage and the third voltage have a first polarity, and the another second voltage and the another third voltage have a polarity opposite that of the first polarity.

6. The display apparatus of claim 5, wherein the energy accumulation circuit comprises:

a variable capacitor, having a first end and a second end, the first end of the variable capacitor being coupled to the switch circuit, the second end of the variable capacitor being coupled to the driving circuit so that the driving circuit is able to provide the first voltage to the second end of the variable capacitor; and a fixed capacitor, having a first end and a second end, the first end of the fixed capacitor being coupled to the switch circuit, the second end of the fixed capacitor being coupled to the driving circuit so that the driving circuit is able to provide the second voltage and the third voltage to the second end of the fixed capacitor.

7. The display apparatus of the claim 5, wherein the switch circuit is a transistor.

8. The display apparatus of the claim 7, wherein the transistor is one of a p-type transistor and an n-type transistor.

9. A method for controlling a pixel unit for use in a display apparatus, the display apparatus comprising a driving circuit, the pixel unit comprising a first end, a second end and a third end, the second end and the third end being electrically connected to the driving circuit respectively, the method comprising:

providing, via the driving circuit, a first voltage to the second end of the pixel unit in a first half period and another first voltage to the second end of the pixel unit in a second half period, the first voltage is opposite to the another first voltage; and providing, via the driving circuit, a second voltage and a third voltage to the third end of the pixel unit to enable the pixel unit in the first half period and another second voltage and another third voltage to the third end of the pixel unit to enable the pixel unit in the second half period to generate a voltage vibration between the first end and the second end to reduce color washout;

wherein the second voltage is opposite to the another second voltage, the third voltage is opposite to the another third voltage, the second voltage is different from the third voltage, the another second voltage is different from the another third voltage the another second voltage is different from the another third voltage, the second voltage and the third voltage have a first polarity, and the another second voltage and the another third voltage have a polarity opposite that of the first polarity.

* * * * *